(12) United States Patent
Dest et al.

(10) Patent No.: US 12,223,565 B2
(45) Date of Patent: Feb. 11, 2025

(54) INCREASING VISIBILITY OF PIXEL PATTERNS IN IMAGES

(71) Applicant: Adobe Inc., San Jose, CA (US)

(72) Inventors: Lauren Dest, Austin, TX (US); Xin Wang, Issaquah, WA (US); Nathan Baldwin, Saratoga Springs, UT (US); Michele Saad, Austin, TX (US); Matthew May, Seattle, WA (US); Jose Ignacio Echevarria Vallespi, Belmont, CA (US); Dustin Ground, Austin, TX (US)

(73) Assignee: Adobe Inc., San Jose, CA (US)

(*) Notice: Subject to any disclaimer, the term of this patent is extended or adjusted under 35 U.S.C. 154(b) by 339 days.

(21) Appl. No.: 17/839,646

(22) Filed: Jun. 14, 2022

(65) Prior Publication Data
US 2023/0401761 A1 Dec. 14, 2023

(51) Int. Cl.
*G06T 11/00* (2006.01)
*G06T 7/11* (2017.01)
*G06T 7/90* (2017.01)
*G06V 10/22* (2022.01)
*G06V 10/762* (2022.01)

(52) U.S. Cl.
CPC ............ *G06T 11/001* (2013.01); *G06T 7/11* (2017.01); *G06T 7/90* (2017.01); *G06V 10/235* (2022.01); *G06V 10/762* (2022.01); *G06T 2200/24* (2013.01); *G06T 2207/10024* (2013.01); *G06T 2207/20021* (2013.01); *G06T 2207/20081* (2013.01); *G06T 2207/20104* (2013.01)

(58) Field of Classification Search
None
See application file for complete search history.

(56) References Cited

PUBLICATIONS

Chang, et al., Palette-Based Photo Recoloring, Special Interest Group on Computer Graphics and Interactive Techniques, Available Online at: https://gfx.cs.princeton.edu/pubs/Chang_2015_PPR/index.php, 2015, 11 pages.
Tan, et al., Efficient Palette-Based Decomposition and Recoloring of Images via RGBXY-Space Geometry, ACM Transactions on Graphics, vol. 37, No. 6, Article 262, Nov. 2018, pp. 1-10.

(Continued)

*Primary Examiner* — Robert J Craddock
(74) *Attorney, Agent, or Firm* — Kilpatrick Townsend & Stockton LLP

(57) ABSTRACT

Methods and systems disclosed herein relate generally to increasing visibility of pixel patterns of an image. The system includes a pattern-detection application accessing an image depicting an object. The pattern-detection application determines a set of colors from the transformed image. The pattern-detection application identifies a set of pixels depicting a particular color of the set of colors. For the set of pixels depicting the particular color, the pattern-detection application converts an initial set of pixel values of the set of pixels at an initial color space to another set of pixel values that define the particular color of the set of pixels in another color space. The pattern-detection application modifies one or more values of the other set of pixel values to generate a modified set of pixel values. The modification includes causing the set of pixels visually indicate a simulated color that is different from the particular color.

20 Claims, 10 Drawing Sheets
(5 of 10 Drawing Sheet(s) Filed in Color)

(56) References Cited

PUBLICATIONS

Li, et al., Self-Correction for Human Parsing, Available Online at: arXiv:1910.09777v1 [cs.CV], Oct. 22, 2019, 10 pages.

Flatla, et al., ColourID: Improving Colour Identification for People with Impaired Colour Vision, CHI '15 Proceedings of the 33rd Annual ACM Conference on Human Factors in Computing Systems, Accessibility for Vision Impaired Users, Apr. 18-23, 2015, pp. 3543-3552.

Graces, et al., A Survey on Intrinsic Images: Delving Deep Into Lambert and Beyond, Available Online at: arXiv:2112.03842v1 [cs.CV], Dec. 7, 2021, 31 pages.

Kanamori, et al., Relighting Humans: Occlusion-Aware Inverse Rendering for Full-Body Human Images, SIGGRAPH Asia, Available Online at: http://kanamori.cs.tsukuba.ac.jp/projects/relighting_human/, 2018, 2 pages.

Color Map with Meaningful Names, Available Online at: http://www.procato.com/rgb+index/?css, Accessed from Internet on Jun. 17, 2022, 3 pages.

BanditPAM: Almost Linear-Time κ-Medoids Clustering, Github, ThrunGroup / BanditPAM, Available Online at: https://github.com/ThrunGroup/BanditPAM, Accessed from Internet on Jun. 16, 2022, 7 pages.

Determining the Optimal Number of Clusters: 3 Must Know Methods, Cluster Validation Essentials, Available Online at: https://www.datanovia.com/en/lessons/determining-the-optimal-number-of-clusters-3-must-know-methods/, Accessed from Internet on Jun. 17, 2022, 14 pages.

INCREASING VISIBILITY OF PIXEL PATTERNS IN IMAGES

TECHNICAL FIELD

This disclosure generally relates to increasing visibility of pixel patterns in images. More specifically, but not by way of limitation, this disclosure relates to using machine-learning techniques to identify colors to identify target pixel patterns.

BACKGROUND

An image typically includes a set of pixels, in which each pixel is represented by a set of pixel values. Each pixel value of the set corresponds to a different aspect of color, depending on the color space being used. For example, in a Red, Green, Blue (RGB) color-space space, the three pixel values in the set respectively denote the red, green, and blue components of the color of that pixel. In a Hue, Saturation, Lightness (HSL) color-space space, the three values in the vector denote the hue, saturation, and brightness of the color of that pixel.

Some color patterns of the image content cannot be recognized by users having accessibility issues (e.g., color-vision deficiency, low visual acuity, low contrast sensitivity). In some instances, the color patterns are not easily recognized in images due to other issues, including a display device being small or displaying the image content in low resolution. To address this issue, text alternatives are often provided to users in addition to the images. For example, when icons are added as images, alternative text describing the image content of the icons are provided with the icons. Providing alternative text can effectively convey the same information conveyed by simpler image content, but may begin to lose effectiveness if an image includes complicated pixel patterns that are difficult to describe in text. In other instances, accessibility issues are addressed by image transformation algorithms. For example, conventional techniques identify a set of pixels that represent colors known to be problematic to certain users (e.g., red-green colors for some types of color vision deficiencies) and transform values of the set of pixels so as to increase color visibility for those users.

SUMMARY

Certain embodiments involve modifying pixel values of an image to increase the visibility of pixel patterns of the image. A pattern-detection application accesses an image depicting an object. The pattern-detection application determines a set of colors from the transformed image. The pattern-detection application identifies a set of pixels depicting a particular color of the set of colors. For the set of pixels depicting the particular color, the pattern-detection application converts an initial set of pixel values of the set of pixels at an initial color space (e.g., an RGB color space) to another set of pixel values that define the particular color of the set of pixels in another color space (e.g., an L*a*b* color space). The pattern-detection application modifies one or more values of the other set of pixel values to generate a modified set of pixel values. The modification includes causing the set of pixels visually indicate a simulated color that is different from the particular color.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1A:
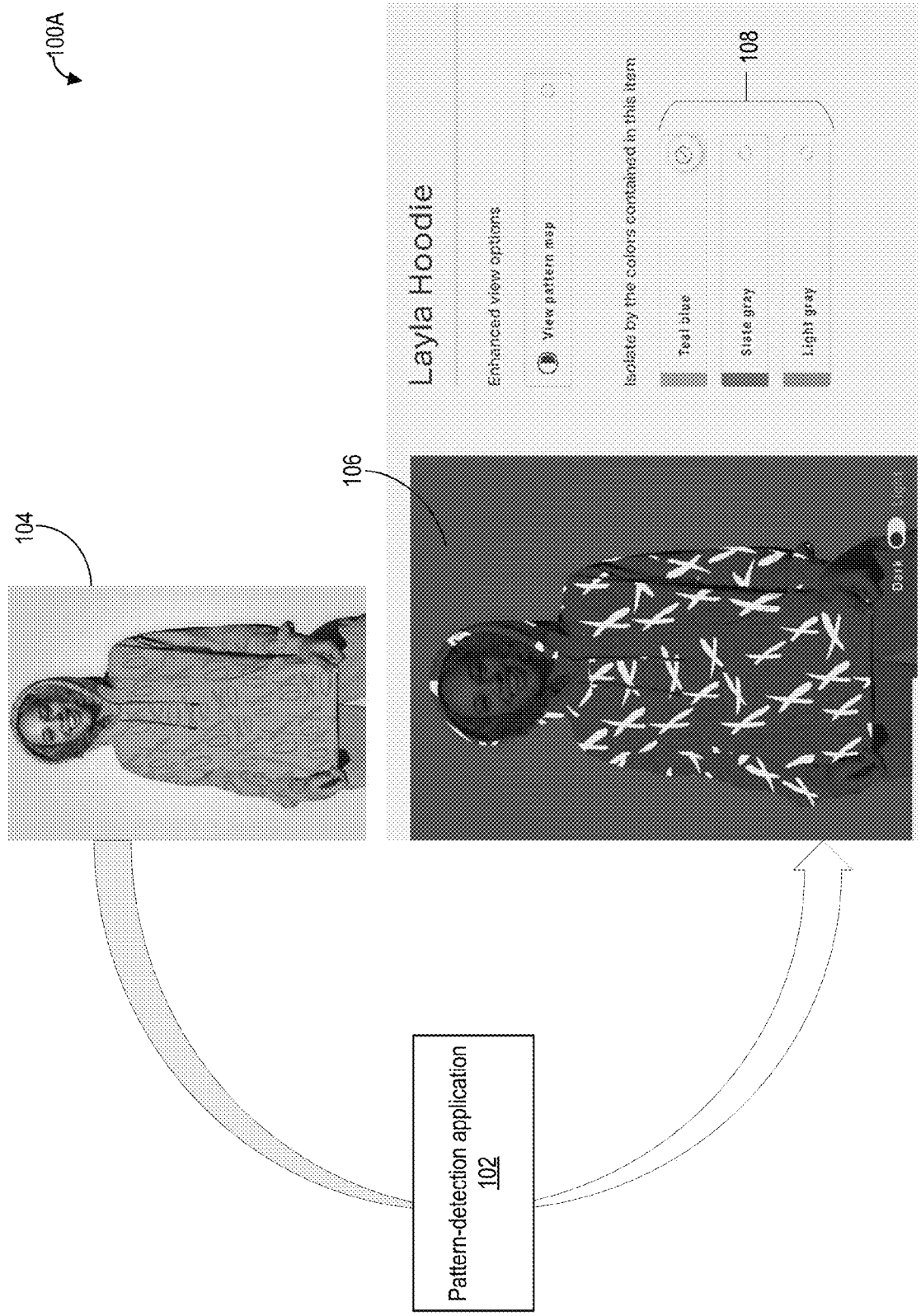
FIGS. 1A-B illustrate example environments for increasing visibility of pixel patterns in images, in accordance with some embodiments.

Conventional image-processing systems used to improve image visibility in accessibility tools transform pixel values that represent colors known to be associated with low visibility to certain users. In addition, conventional systems may provide alternative text in addition to images to provide context for users with accessibility issues. However, these conventional techniques may result in conveying incomplete information (e.g., text ineffectively describing complex pixel patterns) or are ineffective in identifying obscured patterns in the image (e.g., images with modified pixels not increasing visibility of obscured pixel patterns). In addition, the alternative text-based systems are typically intended for users with low vision acuity only. The alternative text-based systems, however, are implemented with an assumption that the intended users do not have color-vision deficiency. In effect, the alternative text-based systems do not provide components that identify specific colors and patterns that are known to confuse users with color-vision deficiency. Accordingly, existing techniques for increasing the visibility of "hidden" pixel patterns (e.g., pixel patterns that may not be visible for users with color-blindness or low visual acuity) often fail to ensure that the pixel patterns are effectively identified from the image.

Certain embodiments described herein can address these problems by increasing contrast between colors of an image to increase visibility of various pixel patterns depicted in the image. A pattern-detection application identifies a set of colors from the image and generates a simulated color (e.g., a grayscale color) for a particular color of the set, in which the contrast between the simulated color and other colors is greater than an existing contrast between the particular color and other colors. In some instances, the pattern-detection application converts all of the colors into simulated colors to further increase color visibility.

The pattern-detection application accesses an image depicting an object. As an illustrative example, the pattern-detection application accesses the image depicting a light gray sweatshirt with teal and dark gray patterns. The teal and dark gray patterns in the sweatshirt may be visible to some users, while the visibility can be reduced for other users. For example, a color-vision deficient user may have difficulties in recognizing the color patterns of the sweatshirt. In another example, a user viewing the image using a device with limited image resolution can also have difficulties in recognizing the colors patterns.

The pattern-detection application applies a machine-learning model to the image to generate a transformed image. The transformed image is generated by applying the machine-learning model to reduce color distortions from the image. In this current example, the pattern-detection application applies the machine-learning model to the image to modify pixel values to remove wrinkles, shadows, or reflections that may distort how colors of the object can be perceived by users. The reduction of color distortions allows the pattern-detection application to convert different shades of the same color to the corresponding simulated color. In some instances, the transformed image is an albedo image. The pattern-detection application performs intrinsic color decomposition to separate the image into an albedo image and a corresponding shading image, then selects the albedo image as the transformed image.

The pattern-detection application determines a set of colors from the transformed image. In this current example, the pattern-detection application identifies teal, slate gray, and light gray colors from the image. In some instances, the pattern-detection application identifies a color identifier (e.g., "brilliant red," Hex code #32CD32) for each determined color (e.g., teal color). To determine the set of colors from the transformed image, the pattern-detection application applies a clustering algorithm to the transformed image to assign each pixel of the transformed image to a respective cluster of a set of clusters. The pattern-detection application determines the set of colors based on the centroids of the respective clusters.

The pattern-detection application identifies a set of pixels depicting a particular color of the set of colors. In this example, the pattern-detection application identifies a set of pixels of the image that corresponds to the teal color, which is to be converted into a simulated color so as to increase contrast with other remaining colors (e.g., light gray, slate gray). In some instances, the pattern-detection application generates an image layer that includes the set of pixels. In this current example, the pattern-detection application generates an image layer that includes the teal color. In some instances, the pattern-detection application stores the image layer as another image file, which can be later used to show pixel patterns that depict the teal color. Additionally or alternatively, the image layer can be stored as an image mask that can be overlaid over the image to segment the pixels depicting the teal color.

For the set of pixels depicting the particular color, the pattern-detection application converts an initial set of pixel values of the set of pixels at an initial color space to another set of pixel values that define the particular color of the set of pixels in another color space. In this current example, the pattern-detection application converts pixel values of the teal pixels from a Red, Green, Blue (RGB) color space to an L*a*b* color space.

The pattern-detection application modifies one or more values of the other set of pixel values to generate a modified set of pixel values. The modification includes causing the set of pixels visually indicate a simulated color that is different from the particular color. In this current example, the modification includes modifying a pixel value associated with an L* channel of the L*a*b* color space. As a result, the image depicts a black simulated color instead of the initial teal color. The contrast between black simulated color and the gray colors of the sweatshirt is increased, and the user can distinguish the teal patterns (shown in black) from other colors of the image.

The pattern-detection application output the set of pixels depicting the simulated color to be displayed on a display device. In this current example, the display device shows the image of the light gray sweatshirt with a slate-gray color pattern and a black color pattern, in which the black color is the simulated color that represents the teal color. The black color increases visibility of pixel patterns depicting the teal color by increasing the contrast between three colors of the image.

Certain embodiments described herein improve image-processing systems by implementing techniques that are effective in increasing visibility of certain pixel patterns in the image. By modifying colors of the image to increase contrast ratios between the colors, the pattern-detection application may reveal one or more target pixel patterns that may otherwise be unidentifiable to certain users. The pattern-detection application performs additional techniques of reducing pixel intensity of the image and modifying pixel values in another color space (e.g., the L*a*b* color space). The simulated colors using the above techniques thus provide more precise visual information as compared to conventional techniques that simply modify colors of the image. The images with simulated colors can also be used to improve performance of image-recognition systems (e.g., video-surveillance systems) that rely on processing images with identifiable content. Accordingly, embodiments herein reflect an improvement in functions of image-processing system and digital image processing technology.

In some embodiments, the pattern-detection application can generate image layers to separately display each color of the image, in which each image layer identifies pixel patterns of a respective color of the image. The techniques implemented by the pattern-detection application enable a user to identify the target pixel pattern regardless of the type of color-vision deficiency. Further, the users can additionally view the actual colors using the image layers, in addition to the simulated colors. Accordingly, embodiments herein reflect an improvement from existing accessibility systems that are typically limited to providing text for images that have reduced visibility.

I. DEFINITIONS

As used herein, the term "color space" refers to a representation of colors. Color spaces help to ensure consistency in color representation across the potentially numerous different devices that may display a digital image. A color of the color space can be represented as tuples of numbers, typically as three or four values or color components. Example color spaces can include an RGB color space and L*a*b* color space.

As used herein, the term "simulated color" refers to a modified color that represents a particular color of the image. The simulated color is different from the particular color, in which a contrast between the simulated color and other colors is greater than an existing contrast between the particular color and other colors. The simulated color can be a grayscale color selected from a lightness scale (e.g., an L* color channel).

As used herein, the term "transformed image" refers to an image generated by a pattern-detection application by at least modifying pixel values of an initial image to reduce color distortions caused by lighting conditions of the surrounding environment. In some instances, the transformed image is an albedo image.

As used herein, the term "intrinsic image decomposition" refers to a process of separating a given image into its formation components, such as reflectance (albedo) and shading (illumination).

As used herein, the term "albedo image" refers to a processed image that is derived from an initial image. The albedo image depicts shadeless colors of the initial image.

As used herein, the term "shading image" refers to a processed image that is derived from an initial image. The shading image depicts only shades of the initial image.

II. OVERVIEW

A. Example Implementations

Figure 1B:
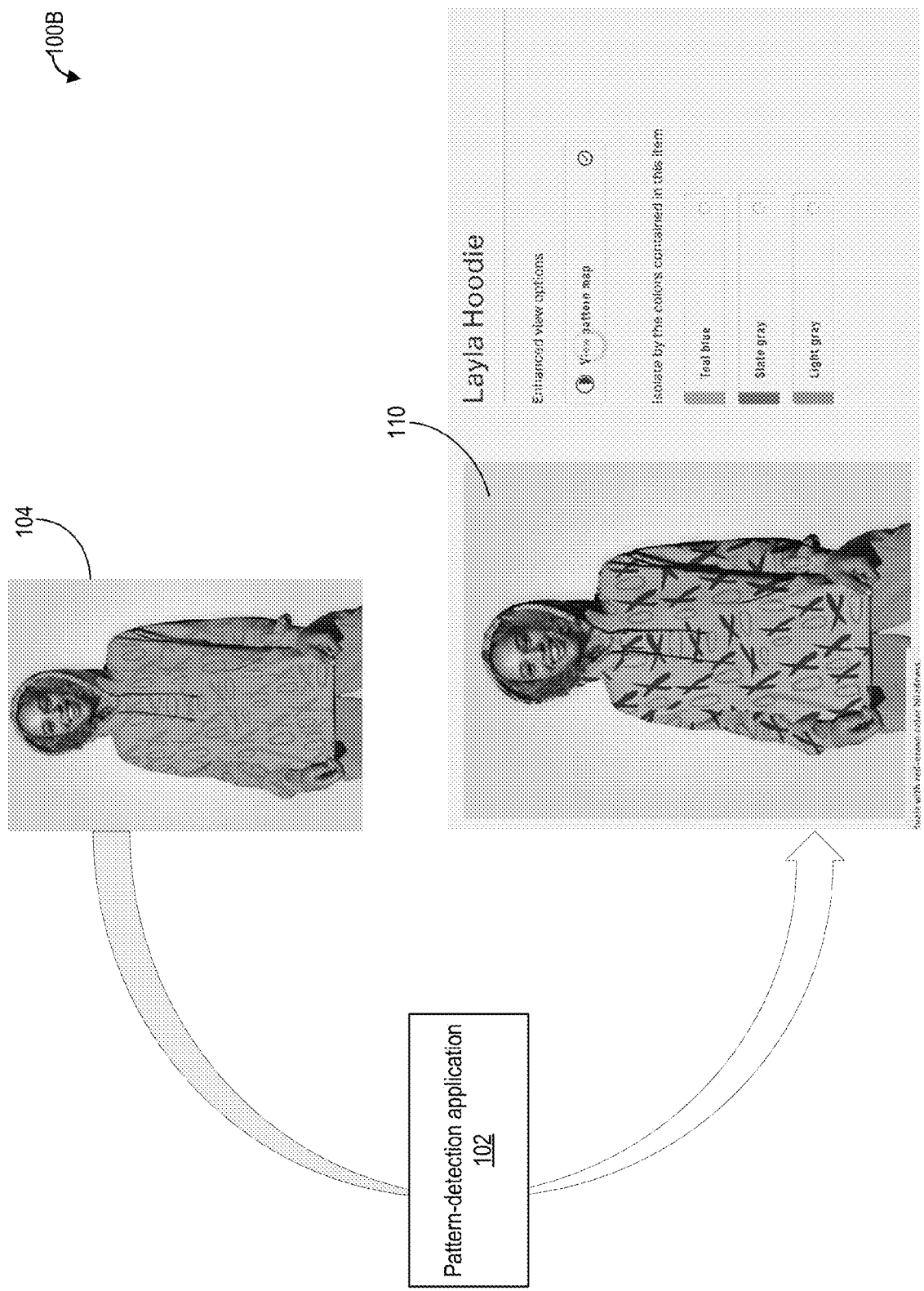

FIGS. 1A-B illustrate example environments 100A-100B for increasing visibility of pixel patterns in images, in accordance with some embodiments. In FIG. 1A, the computing environment 100 includes a pattern-detection application 102, which resides in a computing system 1000 of FIG. 10, that is configured to identify and visualize target pixel patterns within an image 104.

The pattern-detection application 102 accesses the image 104 that depicts an object. For example, the object in the image 104 depicts a light gray sweatshirt with teal and dark gray patterns. The color patterns can be identified by many users, although the pattern visibility may decrease for users with protanopia, tritanopia, or deuteranopia. In addition, the above patterns may have limited visibility for devices show the image in low resolution.

The pattern-detection application 102 processes the image 104 to generate an output 106 that identifies pixels patterns for each color depicted in the image. For example, the output 106 includes an identification of the teal-blue color as a white, "X" pattern in the image, while other colors are shown in a dark background color. A user can interact with the pattern-detection identification 102 to show patterns for other colors of the object, such as selecting an user-interface element for a slate-gray color. In some instances, the pattern-detection application 102 simultaneously displays all color patterns of the image 104, in which each color pattern can be shown by a respective image layer. By segmenting the image 104 to identify specific color patterns, the visibility of the image 104 can be improved.

The pattern-detection application 102 also generates a set of color-identifiers 108 for the colors of the image 104. Although a user may identify the color patterns in the image 104 based on the output 106, the user may not be aware of the specific names for the colors that form the patterns. The pattern-detection application 102 processes the image 104 to determine the three colors as identified by set of color-identifiers 108: (a) teal-blue; (b) slate gray; and (c) light gray. By providing the names of the colors, users with color-vision deficiency can associate a particular color of an object with the corresponding color name.

The pattern-detection application 102 can also generate a simulated image that can be displayed in place of the image. FIG. 1B shows another example for generating a simulated image 110. Similar to FIG. 1A, the object in the image 104 of FIG. 1B depicts a gray sweatshirt with color patterns. The pattern-detection application 102 processes the image 104 to generate the simulated image 110. The simulated image 110 depicts the object with a set of converted colors. The converted colors include grayscale or other colors that can represent the object of the image under high contrast ratio. For example, a first "X" pattern of the image 104 is shown in a darker gray color, a second "O" pattern of the image 104 is shown in a slate-gray color, and the background of the image 104 is shown in a light gray color. The high-contrast view shown in the simulated image 110 allows users with device limitations or color-vision deficiency to readily distinguish one or more patterns shown in the object.

B. Computing Environment

Figure 2:
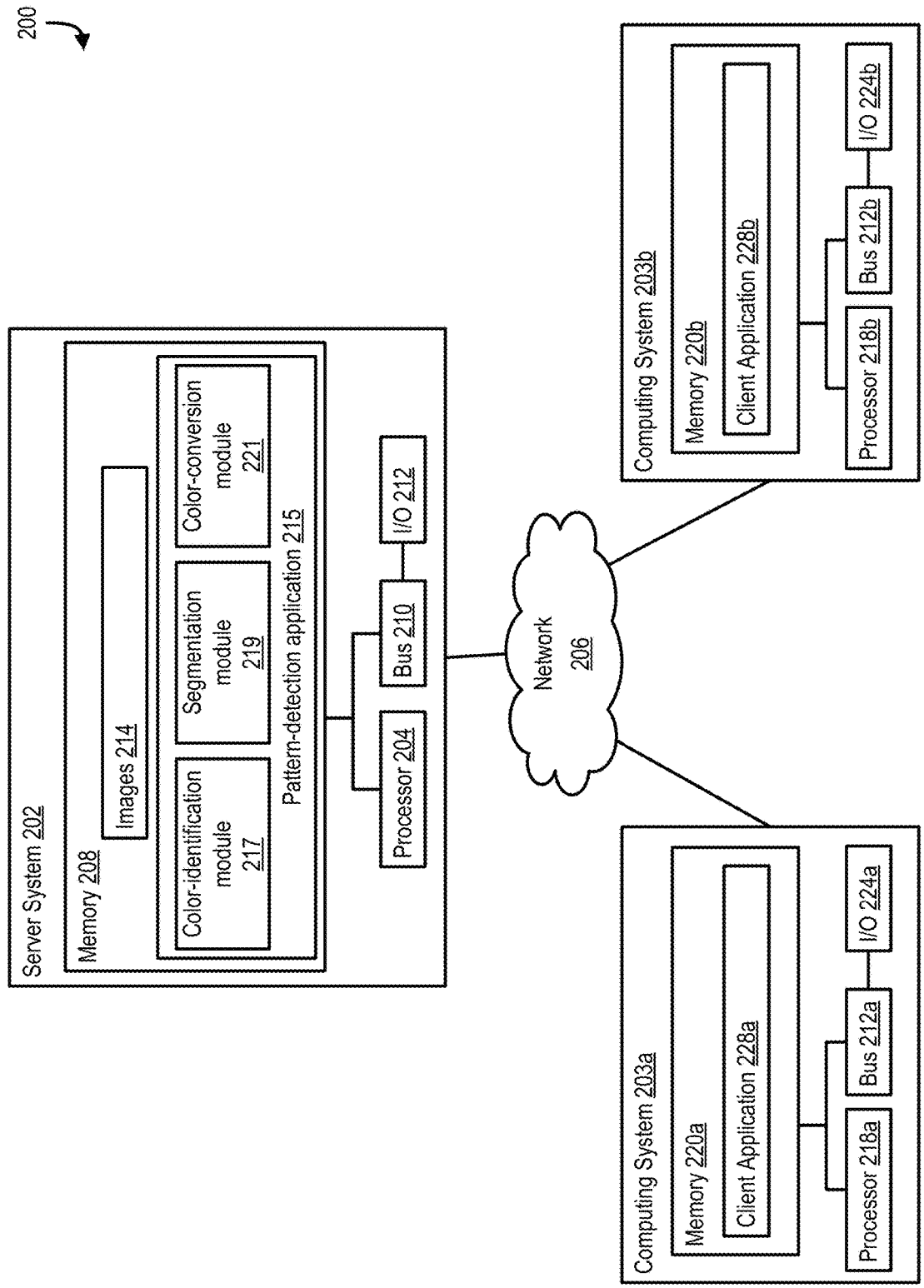
FIG. 2 illustrates a computing environment for increasing visibility of pixel patterns, in images, in accordance with some embodiments.

FIG. 2 illustrates a computing environment 200 for increasing visibility of pixel patterns in images, in accordance with some embodiments. The computing systems in this example include a server system 202 and computing systems 203a and 203b in communication via a network 206.

The server system 202 includes a processor 204 that is communicatively coupled to a memory 208 and that executes computer-executable program instructions and/or accesses information stored in the memory 208. The processor 204 may include a microprocessor, an application-specific integrated circuit ("ASIC"), a state machine, or other suitable processing device. The processor 204 can include any of a number of computer processing devices, including one. Such a processor can include or may be in communication with a computer-readable medium storing instructions that, when executed by the processor 204, cause the processor to perform the steps described herein.

The server system 202 can provide access to images 214. The images 214 may be stored in any suitable computer-readable medium and execute on any suitable processor. In some embodiments, the images 214 are stored in the memory 208 at the server system 202. The images 214 can be accessed by the server system 202 from a remote location via a network 206 and provided to computing systems 203a and 203b. The images 214 may include pixel patterns that have reduced visibility to some users and can be transmitted by the server system 202 to the computing systems 203a and 203b. In some embodiments, the images 214 are generated by the server system 202 or by another system (e.g., application servers). By generating a simulated image from one of the images 214, the server system 202 may increase visibility of pixel patterns such the the output image provides image content that can be easily identifed for many users.

The images 214 may be expressed within a color space. In several embodiments, each of the images 214 comprises a set of pixels. According to some color spaces, each pixel may be associated with a pixel value that is represented as a triplet of color-channel values. For example, with respect to the RGB color space, the color-channel values correspond to the levels of red (R), green (G), and blue (B) primary colors present in the pixel. In some instances, multiple RGB color spaces exist depending on exactly which shade or hue of red, green, and blue is used as the primary color for R, G, and B (e.g., sRGB, Adobe RGB, ProPhoto RGB, scRGB, CIE RGB). In some embodiments, each of the color-channel values in the RGB color space is expressed as an integer between 0 and 255. A value of 0 may correspond to the darkest shade of a primary color, whereas a value of 255 may correspond to the lightest shade. Thus, [0, 0, 0] corresponds to black, and [255, 255, 255] corresponds to white.

A pattern-detection application 215 (e.g., the pattern-detection application 102 of FIGS. 1A-B) stored in the memory 208 can configure the processor 204 to process images 214 to identify a target pixel pattern. The pattern-detection application 215 can configure the processor 204 to access some or all of the images 214 stored in the memory 208 or any other suitable computer-readable medium. The pattern-detection application 215 may provide a social media service, a cloud service, or other network service providing access to the images 214 as well as output images that identify target pixel patterns. A cloud service can include a collection of computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

The pattern-detection application 215 accesses an initial image (e.g., an image of the images 214) that depicts an object and identifies a set of pixels that represent each of the colors within the image. The pattern-detection application 215 can segment a set of pixels having a particular color from other colors of the image, to allow users to readily distinguish the particular color from other colors of the image. In some instances, the pattern-application 215 converts at least one color of the colors of the image into a simulated color (e.g., a grayscale color). The conversion allows the simulated color to have a higher contrast ratio with other colors of the image, thereby increasing the visibility of patterns having the respective color. Additionally or alternatively, the pattern-application 215 converts all of the colors of the image into simulated colors to increase visibility of color patterns depicted in the image.

The pattern-detection application 215 includes the following modules to process an input image: (i) a color-identification module 217 for identifying colors in the image; (ii) a segmentation module 219 for extracting patterns for each color of the image; and (iii) a color-conversion module 221 for converting the image into the simulated image having a high contrast ratio. The above modules can be used individually or in different combinations to allow the pattern detection application 215 to identify the pattern target pixel patterns or to generate the simulated image. Referring to FIGS. 1A-B, the pattern-detection application 215 can use the color-identification module 217 to identify color-identifiers for the set of colors (for example). In another example, the pattern-detection application 215 uses all of the above modules to identify the "X" patterns shown in the output 106.

1. Color-Identification Module

The color-identification module 217 of the pattern-detection application is configured to identify a set of colors that represent a given image. The set of colors are identified such that each color is associated with a particular pattern (e.g., an obscured pattern) shown in the image. The color-identification module 217 applies a machine-learning model to the image to generate a transformed image that identifies a transformed color for each pixel of the image. Generating the transformed image includes modifying pixels of the image to reduce its color distortions. For example, pixel values of the image are modified to remove shading or light reflections that may distort the actual colors of an object depicted by the image. In some instances, the transformed image is an albedo image. The color-identification module 217 performs intrinsic color decomposition to separate the image into an albedo image and a corresponding shading image, then selects the albedo image as the transformed image. The removal of the shade and light reflections can result in removal of one or more characteristics in the image, such as wrinkles, shadows, or reflections of the object.

The color-identification module 217 identifies a set of colors from the transformed image. The set of colors represent one or more colors that depict content of the image, in which each color may be associated with a particular pattern. The identification of the set of colors includes applying a clustering algorithm to the transformed image to generate a plurality of clusters. Each data point forming the clusters represents a pixel of the transformed image, in which the data point identifies a pixel value (e.g., an RGB value) of the pixel. A centroid of each cluster of the plurality of clusters can represent a respective color of the set of colors. The clustering algorithm can include a K-medoids or K-means algorithm.

In some instances, the color-identification module 217 identifies a set of candidate colors based on the plurality of clusters generated by the clustering algorithm. For each candidate color of the set of candidate colors, the color-identification module 217 determines a color-difference metric between the candidate color and each of other candidate colors. The color-identification module 217 determines whether each of the color-difference metrics for the candidate color exceeds a predetermined threshold. If each of the color-difference metrics for the candidate color exceeds the predetermined threshold, the color-identification module 217 assigns the candidate color as a standalone color of the set of colors.

If a particular color-difference metric determined for the candidate color does not exceed the predetermined threshold, the color-identification module 217 identifies the other candidate color that corresponds to the particular color-difference metric. The color-identification module 217 determines a merged color that represents both of the candidate color and the other candidate color. The color-identification module 217 assigns the merged color as a color of the set of colors.

The color-identification module 217 identifies a color-identifier for each color of the set of colors. For each color of the set of colors, the color-identification module 217 accesses a color-identifier library to identify a predefined color, in which the color-difference metric between the predefined color and the color corresponds to the lowest value. The color-identification module 217 identifies a color-identifier associated with the predefined color. The color-identification module 217 designates the predefined color-identifier as the color-identifier for the color.

2. Segmentation Module

The segmentation module 219 of the pattern-detection application is configured to generate an image layer for each color of the set of colors that represent the image. The segmentation module 219 accesses the transformed image and the set of colors outputted by the color-identification module 217. The segmentation module 219 generates an image layer for each color of the set of colors, thereby generating a set of image layers.

The segmentation module 219 associates each pixel of the transformed image to a corresponding image layer, in which the image layer represents a color of the set of colors. For example, the segmentation module 219 identifies a color-difference metric between a pixel value of a pixel of the transformed image (e.g., the albedo image) and each color of the set of colors. The segmentation module 219 then determines a particular color of the set of colors having the lowest color-difference metric. The pattern-detection application iterates through other pixels of the image to identify their respective colors.

The set of colors of the image can be separately identified by associating each color with a corresponding image layer. In some instances, the segmentation module 219 selects an image layer of the set of image layers being associated with the particular color. The segmentation module 219 associates the pixel with the selected image layer. The segmentation module 219 repeats the above steps for all other pixels of the image, such that each pixel of the image is associated with a corresponding image layer of the set of image layers. As a result, each image layer identifies pixels of the image that have a respective color (e.g., teal, slate gray) of the set of colors. By segmenting the image into the set of image layers, the segmentation module 219 can facilitate identification of patterns depicted by each color of the image. Such identification of separate color patterns improves visibility of obscured pixel patterns in the image.

To reduce usage of computing resources, the segmentation module 219 segments an object (e.g., the clothing) depicted in the image and generates the set of image layers for the segmented object. Other contents of the image, such as a background of the image, can be disregarded by the segmentation module 219 from further processing. In some instances, the segmentation module 219 receives user input or other location heuristics to segment the object from other contents of the image.

3. Color-Conversion Module

The color-conversion module 221 of the pattern-detection application is configured to convert pixels values of the pixels such that the pixels depict a simulated color. Thus, the image displays the simulated color in place of the particular color, resulting in a higher contrast between the simulated color and other colors of the image. The conversion to simulated color thus increases visibility of the color patterns of the image for certain users. For example, the color-conversion module 221 accesses an initial set of pixel values of a set of pixels at an initial color space. The set of pixels can be pixels identified to depict a particular color. The color-conversion module 221 converts the initial set of pixel values to another set of pixel values that define the particular color of the set of pixels in another color space. For example, the set of pixels include an initial set of pixel values represented within an RGB color space (e.g., the initial color space). The color-conversion module 221 can convert the initial set of pixels values into another set of pixel values that represents the particular color within an L*a*b* color space.

The color-conversion module 221 modifies one or more values of the other set of pixel values to generate a modified set of pixel values. In particular, the color-conversion module 221 modifies at least one pixel value to cause the set of pixels to visually indicate a simulated color that is different from the particular color. For example, the color-conversion module 221 modifies the a and b values of the L*a*b* color space to zero. The color-conversion module 221 determines a simulated color (e.g., a grayscale color) for the set of pixels, by adjusting another pixel value of the other set of pixel values (e.g., an L* value of the L*a*b* color space). The color-conversion module 221 thus outputs the set of pixels to depict the simulated color that is different from the particular color. The simulated color results in an increase of contrast ratio between the set of pixels depicting the simulated color and other pixels of the image. The increase of contrast between pixels of the image allows users with device limitations or color-vision deficiency to readily distinguish one or more patterns having the particular color from other patterns of the image that have different colors.

In some instances, the color-conversion module 221 determines the simulated color for each color of the set of colors. The color-conversion module 221 accesses a second set of pixels that identify a second color of the set of colors. The color-conversion module 221 converts a second initial set of pixel values of the second set of pixels to a third set of pixel values that define the second color in the other color space. The color-conversion module 221 modifies pixel values of the third set of pixel values to generate a second modified set of pixel values. The second modified set of pixel values cause the second set of pixels to visually indicate a second simulated color that is different from the second color and the simulated color. The above process can be repeated for other remaining colors of the set of colors of the image, thereby resulting in a simulated image (e.g., a grayscale image) that includes a set of simulated colors.

Referring back to FIG. 2, the server system 202 may also include a number of external or internal devices, such as input or output devices. For example, the server system 202 is shown with an input/output ("I/O") interface 212. A bus 210 can also be included in the server system 202. The bus 210 can communicatively couple one or more components of the server system 202.

FIG. 2 also illustrates the pattern-detection application 215 included in the memory 208 of the server system 202. The pattern-detection application 215 can include one or more modules. The pattern-detection application 215 can configure the server system 202 to access, modify, transmit, or otherwise use the images 214 in response to input provided by the client applications 228a and/or 228b. For example, the client application 228a transmits a query to retrieve an image of the images 214, at which the server system 202 may access the image by processing the query through a database system.

The pattern-detection application 215 can also configure the server system 202 to allow multiple computing systems 203a and/or 203b or other client systems to access or otherwise use some or all of the images 214. In some embodiments, the pattern-detection application 215 stores data in the memory 208 identifying client accounts via which the client applications 228a and/or 228b can access the pattern-detection application 215. In other embodiments, the pattern-detection application 215 accesses data from a remote data source that identifies client accounts via which the client applications 228a and/or 228b can access the pattern-detection application 215. The pattern-detection application 215 can store data describing associations between client accounts and items of the images 214.

The server system 202 can include any suitable computing system for hosting the pattern-detection application 215. In one embodiment, the server system 202 may be a single computing system. In another embodiment, the server system 202 may be a virtual server implemented using a number of computing systems connected in a grid or cloud computing topology.

Each of the computing systems 203a and/or 203b includes a computer-readable medium, such as processors 218a and/or 218b, respectively. Each of the processors 218a and/or 218b is communicatively coupled to a memory 220a and/or 220b, respectively. Each of the processors 218a and/or 218b respectively executes computer-executable program instructions and/or accesses information stored in the memory 220a and/or 220b. Each of the processors 218a and/or 218b may include a microprocessor, an ASIC, a state machine, or other processor. Each of the processors 218a and/or 218b can include any of a number of computer processing devices, including one. Such a processor can include or may be in communication with a computer-readable medium. The computer-readable medium stores instructions that when executed by the processor, cause the processor to perform the steps described herein.

The computing systems 203a and/or 203b may also include a number of external or internal devices, such as a mouse, a CD-ROM, DVD, a keyboard, a display, audio speakers, one or more microphones, or any other input or output devices. For example, each of the computing systems 203a and/or 203b is respectively shown with input/output ("I/O") interfaces 224a, 224b and display devices 226a, 226b. Buses 222a, 222b can be respectively included in the computing systems 203a and/or 203b. Each of the buses 222a, 222b can communicatively couple one or more components of the computing systems 203a and/or 203b.

FIG. 2 also illustrates the client applications 228a and/or 228b respectively included in the memory 220a and/or 220b of the computing systems 203a and/or 203b. Each of the client applications 228a and/or 228b can include one or more software modules. The client applications 228a and/or 228b can respectively configure the processors 218a and/or 218b to modify or otherwise access the images 214 provided by the server system 202 via the network 206. The client applications 228a and/or 228b can respectively configure the processors 218a and/or 218b to respectively render some or all of the images 214 as well as output images that include unmasked pixel patterns. For example, each of the client applications 228a and/or 228b is an internet browser application, a social media application, and the like. A network session for accessing or otherwise modifying the images 214 can be established by the client applications 228a and/or 228b via the network 206 between computing systems 203a and/or 203b and the server system 202.

In some embodiments, the computing systems 203a and/or 203b include any suitable client devices for communicating via a network 206 and executing the client applications 228a and/or 228b. Non-limiting examples of a computing device include a desktop computer, a tablet computer, a smart phone, or any other computing device suitable for using electronic content. In other embodiments, the computing systems 203a and/or 203b include server systems for providing electronic content items via the client applications 228a and/or 228b.

III. Process for Increasing Visibility of Pixel Patterns in Images

Figure 3:
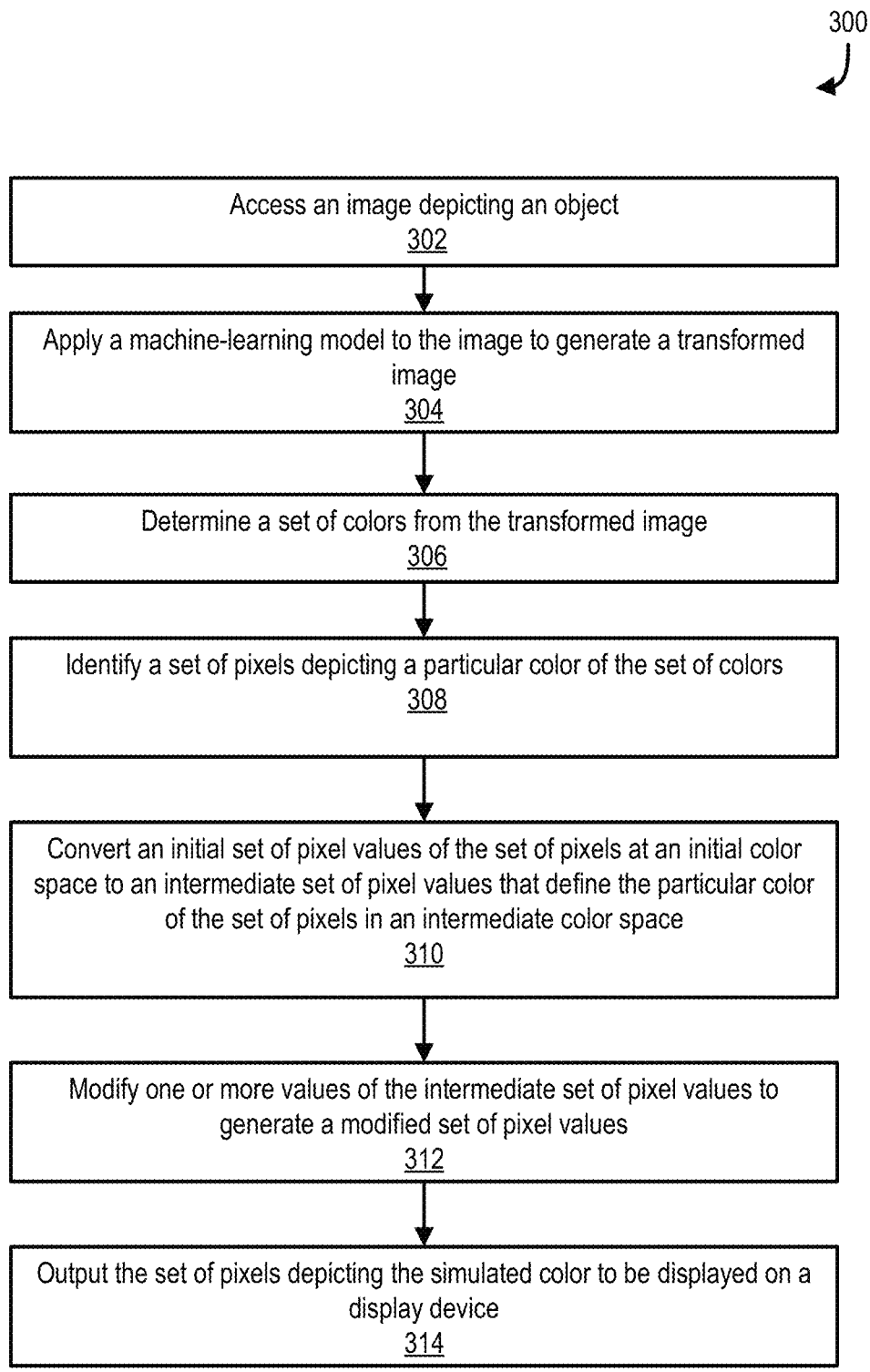
FIG. 3 illustrates a process for increasing visibility of pixel patterns in images, in accordance with some embodiments.

FIG. 3 illustrates a process 300 for increasing visibility of pixel patterns in images in accordance with some embodiments. For illustrative purposes, the process 300 is described with reference to the components illustrated in FIG. 2, though other implementations are possible. For example, the program code for pattern-detection application 215 of FIG. 2, which is stored in a non-transitory computer-readable medium, is executed by one or more processing devices to cause the server system 202 to perform one or more operations described herein.

At step 302, the pattern-detection application accesses an image depicting an object. The images may be expressed within a color space. A color space refers to an abstract mathematical model for representing the colors that comprise an image. Color spaces help to ensure consistency in color representation across the potentially numerous different devices that may display a digital image. In several embodiments, the image comprises a plurality of pixels. According to some color spaces, each pixel may be associated with a pixel value that is represented as a triplet of color-channel values. For example, with respect to the RGB color space, the color-channel values correspond to the levels of red (R), green (G), and blue (B) primary colors present in the pixel. In some instances, multiple RGB color spaces exist depending on exactly which shade or hue of red, green, and blue is used as the primary color for R, G, and B (e.g., sRGB, Adobe RGB, ProPhoto RGB, scRGB, CIE RGB).

At step 304, the pattern-detection application applies a machine-learning model to the image to generate a transformed image, in which generating the transformed image includes modifying one or more pixels of the image to reduce color distortions from the image. In some instances, the transformed image is an albedo image. The pattern-detection application performs intrinsic color decomposition to separate the image into an albedo image and a corresponding shading image, then selects the albedo image as the transformed image.

At step 306, the pattern-detection application determines a set of colors from the transformed image. In some instances, the pattern-detection application identifies a color identifier (e.g., "brilliant red," Hex code #32CD32) for each determined color (e.g., teal color). For example, the set of colors include teal, slate gray, and light gray for an image depicting a sweatshirt. To determine the set of colors from the transformed image, the pattern-detection application applies a clustering algorithm to the transformed image to assign each pixel of the transformed image to a respective cluster of a set of clusters. In some instances, the clustering algorithm includes a k-medoids algorithm or a k-means algorithm. Then, for each cluster of the set of clusters, the pattern-detecting application determines a centroid for a cluster of the set of clusters. The pattern-detection application determines a color represented by the centroid of the cluster. The pattern-detection application assigns the color as being one of the set of colors.

At step 308, the pattern-detection application identifies a set of pixels depicting a particular color of the set of colors. To identify the set of pixels depicting the particular color, the pattern-detection application performs the following operations. For each color of the set of colors, the pattern-detection application: (i) determines a color-difference metric between a pixel of the transformed image and a color value identifying the color; and (ii) associates the color-difference metric for the color. The color-difference metric can include $\Delta E^*$ of the CIELAB color space (e.g., CIE76, CIE94, CIEDE2000). The pattern-detection application determines, from the set of colors, that the particular color has the lowest color-difference metric relative to other colors of the set of colors. The pattern-detection application assigns the pixel as being one of the set of pixels for the particular color.

In some instances, the pattern-detection application generates an image layer that includes the set of pixels, at which the image layer can be applied to distinguish the set of pixels having the particular color from other pixels of the image. For example, the pattern-detection application generates an image layer and assigns pixel values of the set of pixels to the image layer. The pattern-detection application can assigns pixel values to the image layer by receiving a user input that identifies one or more regions in the image. The pattern-detection application applies the image layer to the image to generate a segmented image. The segmented image identifies the set of pixels while masking other pixels of the set of pixels. The pattern-detection application may output the image layer on a user interface, which allows a user to view specific pixel patterns depicting the particular color.

At step 310, the pattern-detection application converts an initial set of pixel values of the set of pixels at an initial color space to another set of pixel values that define the particular color of the set of pixels in another color space. In some instances, the initial color space is a Red, Green, Blue (RGB) color space or a Hue, Saturation, B rightness (HSB) color space. The other color space can be an L*a*b* color space.

At step 312, the pattern-detection application modifies one or more values of the other set of pixel values to generate a modified set of pixel values. The modification includes causing the set of pixels visually indicate a simulated color that is different from the particular color. For example, the modification includes modifying a pixel value associated with an L* channel of the L*a*b* color space, such that the set of pixels depict a black simulated color instead of the initial teal color.

At step 314, the pattern-detection application outputs the set of pixels depicting the simulated color to be displayed on a display device. The simulated color increases visibility of pixel patterns depicting the particular color by increasing the contrast between the colors of the image. For example, a first contrast ratio between the simulated color and another color of the set of colors is greater than a second contrast ratio between the particular color and the other color. Process 300 terminates thereafter.

IV. Identifying Colors in an Image

The pattern-detection application performs color segmentation and identification, to allow low-vision, color-blind users to understand which colors and where they are applied. In some instances, the pattern-detection application performs pre-processing of an image to ensure accurate identification of its colors.

A. Machine-Learning for Image Transformation

Figure 4:
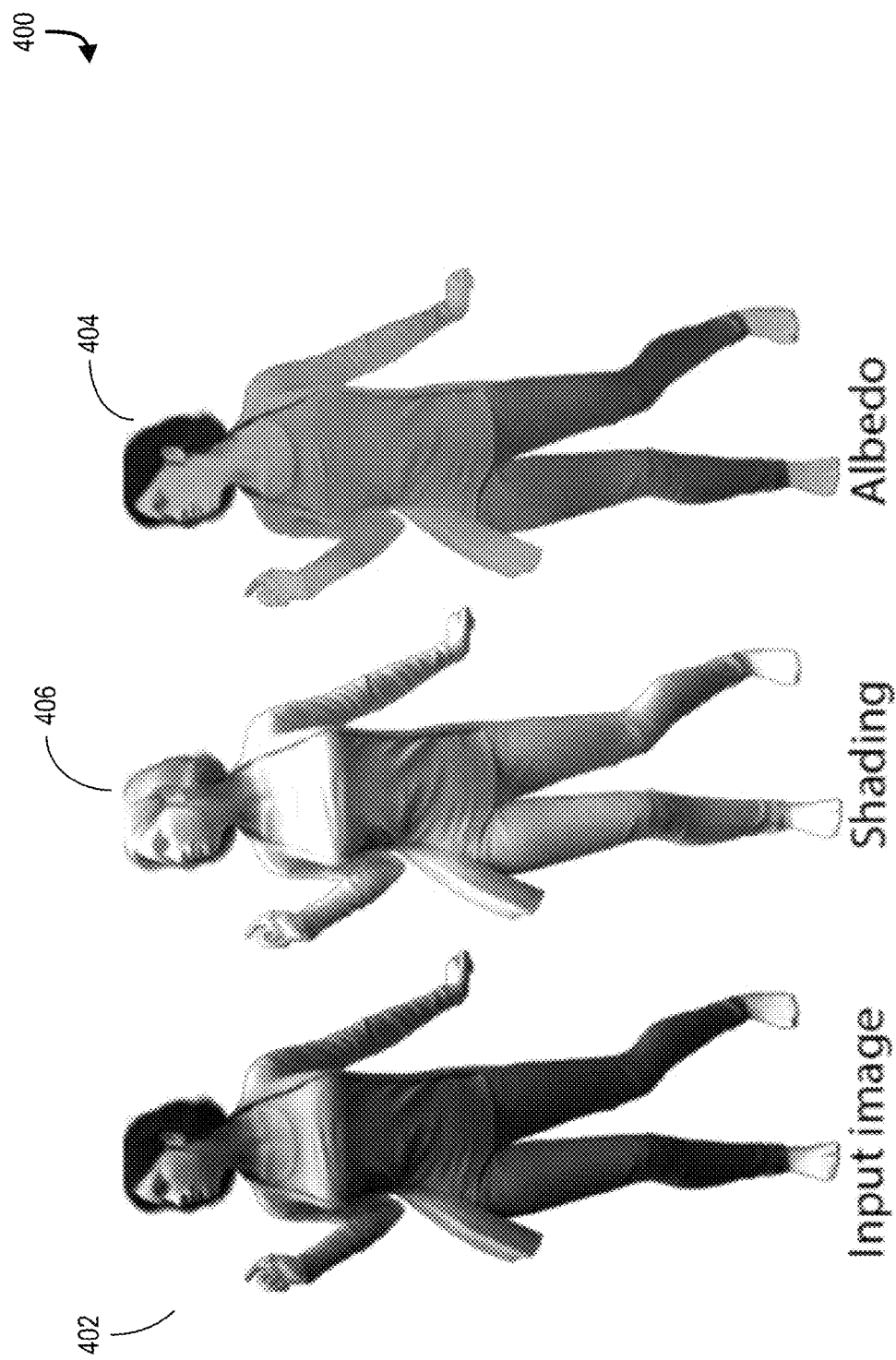
FIG. 4 shows an example set of images processed to identify a set of colors from an initial image, according to some embodiments.

FIG. 4 shows an example set 400 of images processed to identify a set of colors from an initial image, according to some embodiments. In FIG. 4, an image 402 depicting products (e.g., clothes, accessories) and model is shown. In fashion shoots, lighting can be placed to place emphasis on the products and the model. Depending on the material properties, the lighting, and the design of the products, color differences due to shading may appear in the final photo. Theses shading may cause the same original color to appear darker or lighter in some areas of the image 402, depending on the orientation with respect to the camera and the light sources.

To address for the complex reflections and shadings, the pattern-detection application generates a transformed image by modifying one or more pixels of the image to reduce color distortions from the image. For example, pixel values of the image are modified by the pattern-detection application to remove shading or light reflections that may distort the actual colors of an object depicted by the image. As a result, the actual colors of the products and the model can be captured in a transformed image. In FIG. 4, the transformed image is an albedo image 404 generated by performing intrinsic image decomposition on the image. For example, the intrinsic image decomposition separates each pixel color into a respective albedo color and a shading component, at which the albedo color can be used as the color of the pixel of the transformed image. Thus, shadings 406 from the image 402 are removed to generate the transformed image.

Figure 5:
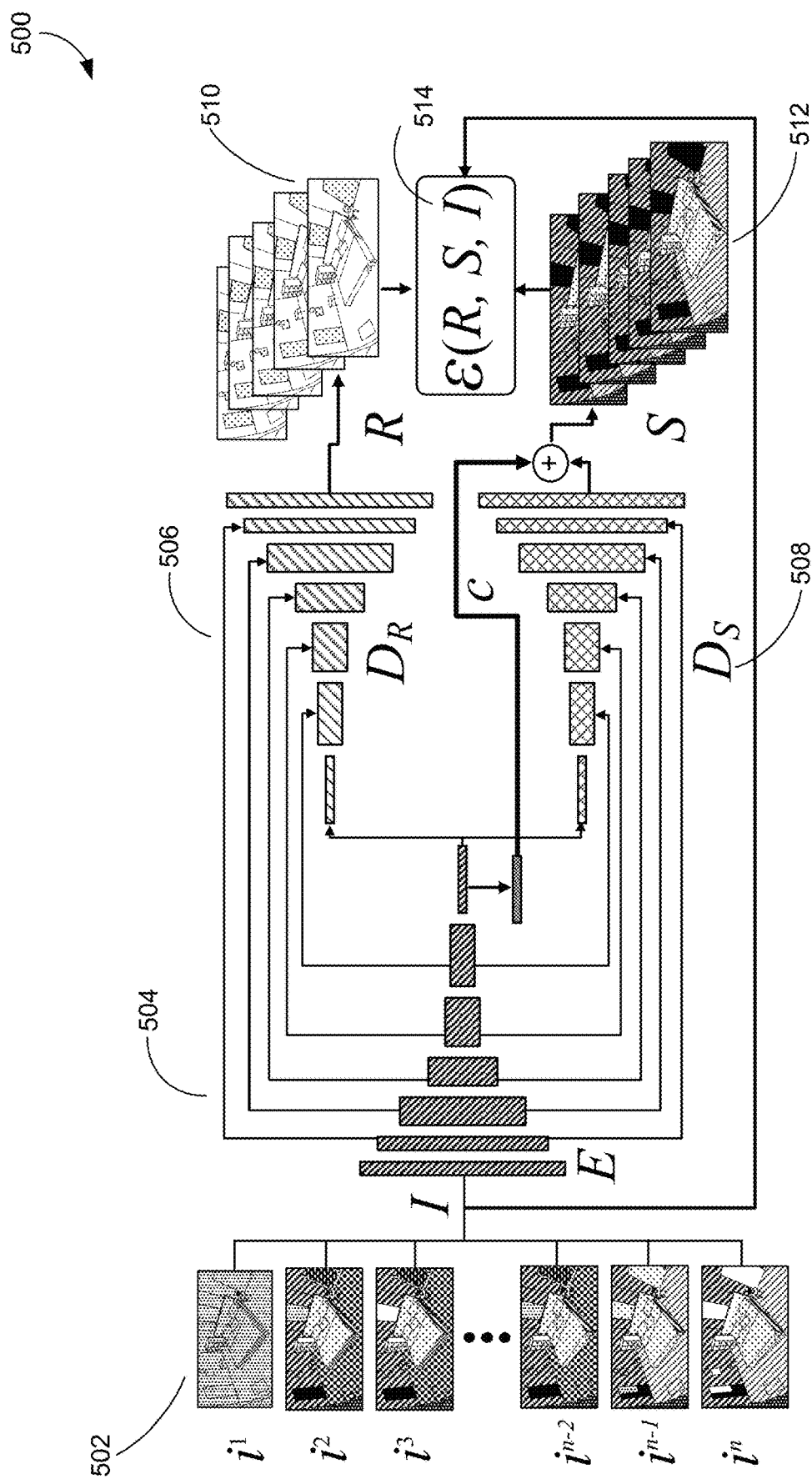
FIG. 5 illustrates an example network architecture for training a machine-learning model machine-learning to reduce color distortions, according to some embodiments.

To generate the transformed image, the pattern-detection application applies a machine-learning model to the image. The machine-learning model is trained to identify actual colors of the image by reducing light reflections and shadings from the image. FIG. 5 illustrates an example network architecture for training a machine-learning model 500 to reduce color distortions, according to some embodiments. The machine-learning model 500 includes a U-Net architecture. In FIG. 5, the machine-learning model 500 receives a set of training images 502, which can be an image sequence obtained from a video file. The set of training images 502 capture a training object a fixed position, but at least one training image is associated a different illumination. For each training image of the set 502, the training image is processed by an encoder 504 of the machine-learning model 500 to produce another output. In some instances, the encoder 504 is a convolutional neural network that includes a set of layers, in which each layer includes 4×4 convolutional sub-layers followed by a batch normalization sub-layer and a rectified linear unit (ReLU) sub-layer.

The intermediate output of the encoder 504 is processed by a reflectance decoder 506 to generate a corresponding albedo image 510. In addition, the intermediate output of the encoder 504 is also processed by a shading decoder 508 to generate a corresponding shading image 512. Because the albedo image 510 includes the actual colors, the pixel values across albedo images should remain constant. On the other hand, because at least one training image involves a different lighting condition, pixel values of at least one of the shading images should be different from another shading image. In some instances, each of the reflectance decoder 506 and shading decoder 508 is a convolutional neural network that includes a set of layers, in which each layer includes 4×4 convolutional sub-layers followed by a ReLU sub-layer. A loss function 514 of the machine-learning model 500 is applied to the albedo image 510 and the shading image 512 to determine a loss. For example, the loss function 514 calculates the loss one or more of the following loss components:

$$\varepsilon(R,S,I) = L_{reconstruct} + w_1 L_{consistency} + w_2 L_{rsmooth} + w_3 L_{ssmooth}$$

In the loss function 514, $L_{reconstruct}$ corresponds to an image reconstruction loss, in which the loss is determined between a reconstructed image from the albedo image 510 and the shading image 512, and a corresponding training image. In addition, $L_{consistency}$ corresponds to a reflectance consistency loss, in which the loss is determined based on a difference between the albedo image 510 and other albedo images of the training images. $L_{rsmooth}$ corresponds to a reflectance smoothness loss, in which the loss is determined based on a predicted pixel intensity at each pixel in a sequence of albedo images to predicted pixel intensity of other pixels in the sequence. $L_{ssmooth}$ corresponds to a shading smoothness loss, in which the loss is determined based on determined based on a predicted pixel intensity at each pixel in a sequence of shading images to predicted pixel intensity of other pixels in the sequence.

Once the loss is determined, the parameters of the encoder 504 and/or decoders 506-508 can then be adjusted based on the determined loss. Training of the machine-learning model 500 continues until the loss is minimized.

B. Color Identification

Referring back to FIG. 4, some shading residuals can be seen around wrinkles of the albedo image 412. To address the residual shadings, the pattern-detection application performs additional steps to accurately identify the most relevant set of colors from the object depicted in the image. The additional steps include performing a color palette extraction to identify the set of colors (e.g., a color palette). Each color in the set can be used to by the pattern-detection application (e.g., a segmentation module of the pattern-detection application) to segment a corresponding image layer from the transformed image. The pattern-detection application performs the color identification to satisfy that following requirements:

1) Colors need to be derived from albedo colors of the image;
2) Different colors should be segmented into their respective image layers; and
3) Similar colors should be grouped into the same image layer, to avoid generating redundant image layers.

The pattern-detection application can identify the set of colors by applying a k-means clustering algorithm to the transformed image, in which the image can be within an RGB color space or in a perceptual color space, such as CIE Lab (e.g., L*a*b* color space). Each data point forming the clusters represents a pixel of the transformed image, in which the data point identifies a pixel value (e.g., an RGB value) of the pixel. Once the clusters are formed, centroids of the clusters are selected. The colors represented by the centroids can be added into the set of colors.

To further enhance accuracy of color identification, the pattern-detection application applies a k-medoids, in which the cluster centroids corresponds to actual colors. In some instances, an optimal number of clusters are selected to identify the set of colors. For example, the optimal number of clusters are selected using various techniques, including: (1) a dendrogram method that generates a dendrogram based on hierarchical clustering of the set of clusters; (2) an elbow method that compares total within-cluster sum of square (WSS) values between clustering algorithms (e.g., 2-medoids, 4-medoids, 7-medoids); (3) a silhouette method that compares the average silhouette of observations between the clustering algorithms; (4) gap statistic methods that compares total within intra-cluster variation between observed data from the clustering algorithms and null hypothesis.

In some instances, a particular cluster-number optimization method (e.g., the elbow method) may generate a set of clusters have different properties from those generated by another cluster-number optimization method (e.g., the silhouette method). To address this discrepancy, the pattern-detection application analyzes the set of colors to merge one or more colors determined to be similar to each other. For example, the pattern-detection application identifies a set of candidate colors based on the set of clusters generated by the clustering algorithm. For each candidate color of the set of candidate colors, the pattern-detection application determines a color-difference metric between the candidate color and each of other candidate colors. The pattern-detection application determines whether each of the color-difference metrics for the candidate color exceeds a predetermined threshold. If each of the color-difference metrics for the candidate color exceeds the predetermined threshold, the pattern-detection application assigns the candidate color as a standalone color of the set of colors.

If a particular color-difference metric determined for the candidate color does not exceed the predetermined threshold, the pattern-detection application identifies the other candidate color that corresponds to the particular color-difference metric. The pattern-detection application determines a merged color that represents both of the candidate color and the other candidate color. The pattern-detection application assigns the merged color as a color of the set of colors.

In some instances, the pattern-detection application identifies a color-identifier for each color of the set of colors. Color naming can vary with geo location, culture, or time. For each color of the set of colors, the pattern-detection application accesses a color-identifier library to identify a predefined color, in which the color-difference metric between the predefined color and the color corresponds to the lowest value. The pattern-detection application identifies a color-identifier associated with the predefined color. The pattern-detection application designates the predefined color-identifier as the color-identifier for the color. In some instances, one or more color-identifier libraries are combined to identify the predefined color.

V. Segmenting the Image to Isolate Pixel Patterns

Figure 6:
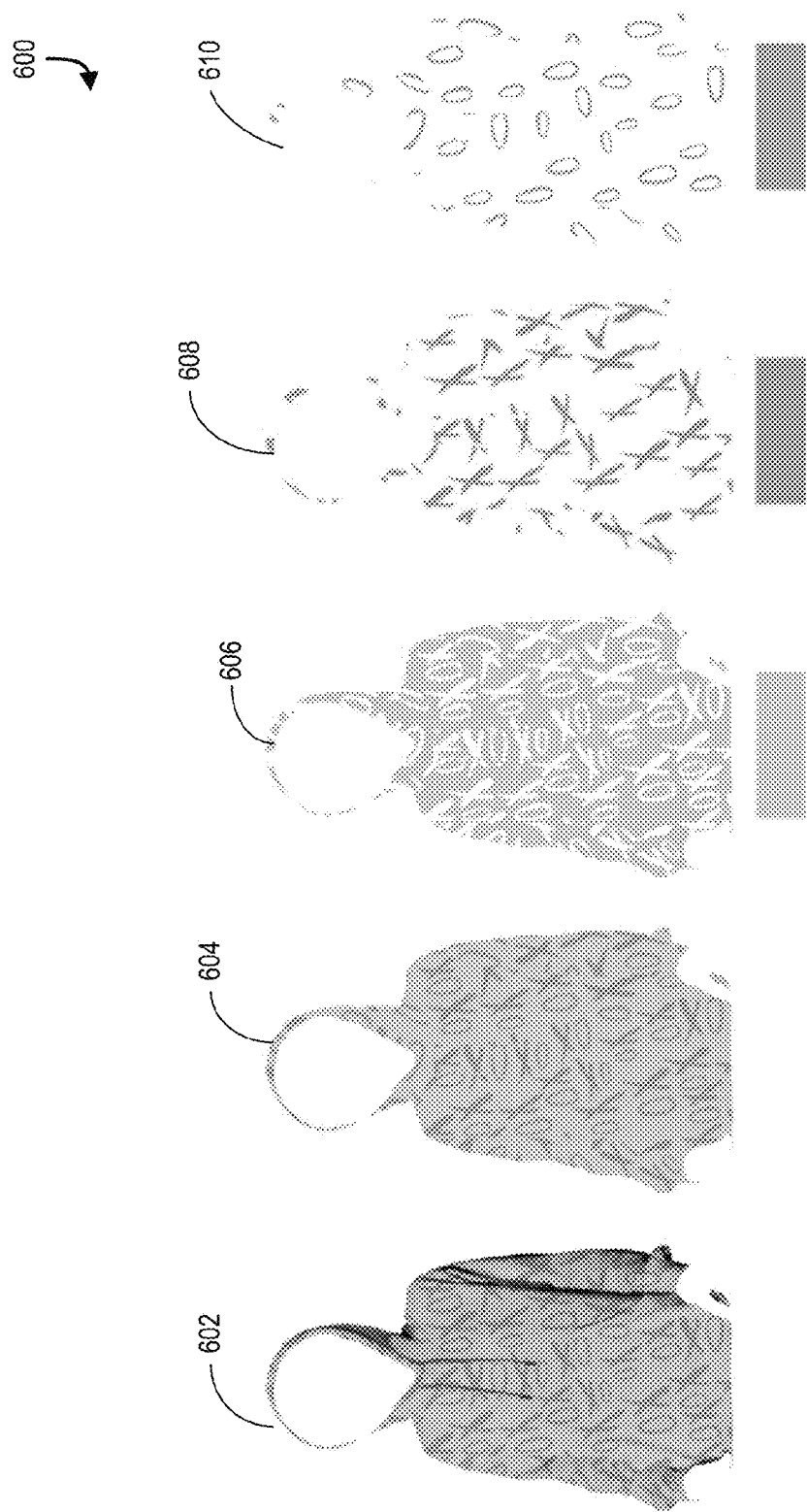
FIG. 6 shows an example set of images that identify an image layer for each color of the image, according to some embodiments.

In some instances, the set of colors are used to identify corresponding areas in the image, which allows users to view the color patterns of a particular color as a visual reference. FIG. 6 shows an example set of images 600 that identify an image layer for each color of the image, according to some embodiments. In FIG. 6, an image 602 shows a light gray sweatshirt with teal and dark gray color patterns. A transformed image 604 (e.g., the albedo image) generated from the image 602 is also shown.

The pattern-detection application determines, for each pixel of the transformed image 604, a corresponding color of the set of colors. In some instances, for each pixel of the transformed image 604, the pattern-detection application a color-difference metric between a pixel value of the pixel and a color value for each color of the set of colors. The pattern-detection application then determines a particular color of the set of colors having the lowest color-difference metric. The pattern-detection application iterates through other pixels of the image to identify their respective colors.

The set of colors of the image 602 can be separately identified by associating each color with a corresponding image layer. In some instances, the pattern-detection application selects an image layer of the set of image layers being associated with the particular color. The pattern-detection application associates the pixel with the selected image layer. The pattern-detection application repeats the above steps for all other pixels of the image, such that each pixel of the image is associated with a corresponding image layer of the set of image layers. As a result, each image layer identifies pixels of the image that have a respective color (e.g., teal, dark gray) of the set of colors. By segmenting the image into the set of image layers, the pattern-detection application can facilitate identification of patterns depicted by each color of the image. Such identification of separate color patterns improves visibility of obscured pixel patterns in the image. For example, a first image layer 606 identifies color patterns for light gray color of the sweatshirt, a second image layer 608 identifies color patterns for teal color of the sweatshirt, and a third image layer 610 identifies color patterns for dark gray color of the sweatshirt.

To reduce usage of computing resources, the pattern-detection application segments an object (e.g., the clothing) depicted in the image, identifies colors of the segmented object, and generates the set of image layers for the segmented object. Other contents of the image, such as a background of the image, can be disregarded by the segmentation module 219 from further processing. In some instances, the segmentation module 219 receives user input or other location heuristics to segment the object from other contents of the image.

VI. Generating Simulated Colors

The pattern-detection application is configured to convert pixels values of the pixels, such that the pixels depict a simulated color. Thus, the image displays the simulated color in place of the particular color, resulting in a higher contrast between the simulated color and other colors of the image. The conversion to simulated color thus increases visibility of the color patterns of the image for certain users.

Generating simulated colors includes two stages. For a particular color of the set of colors, the pattern-detection application: (1) converts the pixel values of the pixels depicting the particular color from an initial color space to another color space; and (2) modifying the pixel values in the other color space to generate a simulated color for the particular color.

A. Converting Pixel Values to Another Color Space

Figure 7:
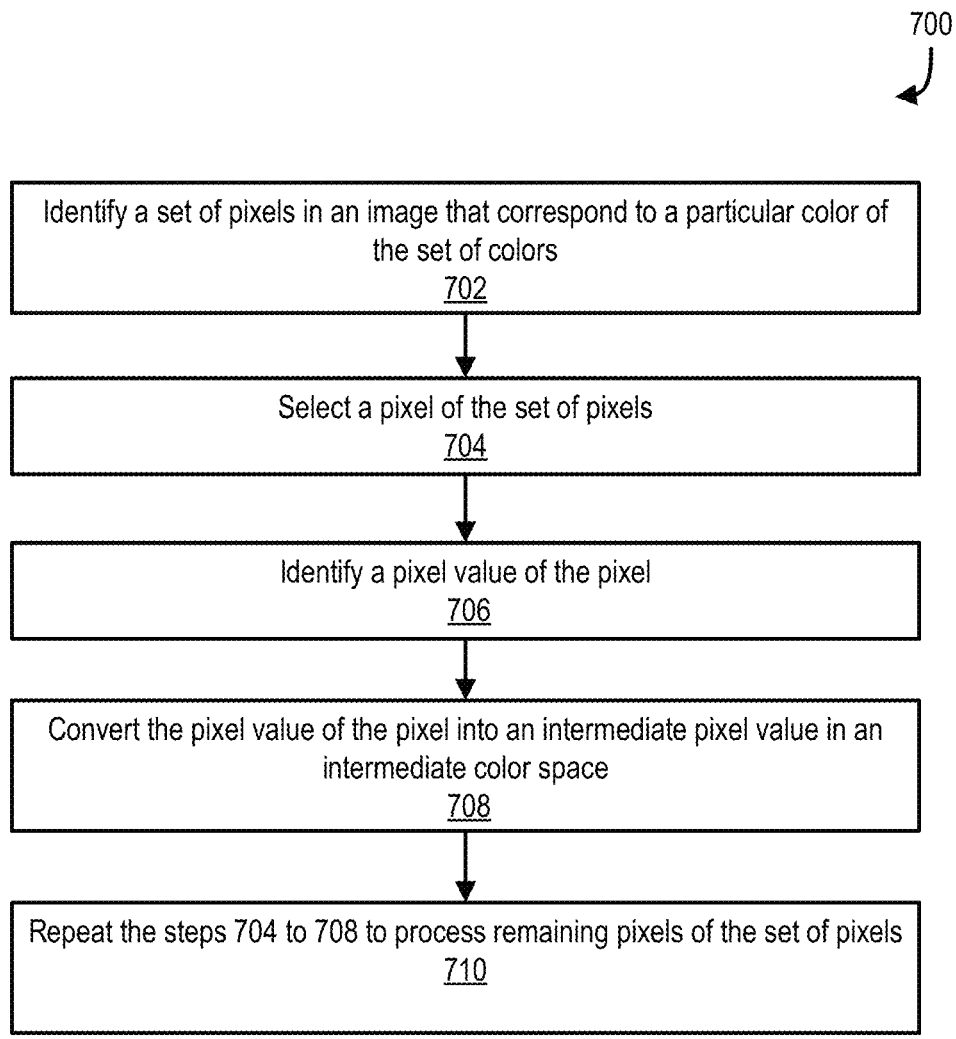
FIG. 7 illustrates a process for converting image pixel values to another color space, in accordance with the embodiments.

FIG. 7 illustrates a process 700 for converting image pixel values to another color space in accordance with the embodiments. For illustrative purposes, the process 700 is described with reference to the components illustrated in FIG. 2, though other implementations are possible. For example, the program code for pattern-detection application 215 of FIG. 2, which is stored in a non-transitory computer-readable medium, is executed by one or more processing devices to cause the server system 202 to perform one or more operations described herein.

At step 702, a pattern-detection application identifies a set of pixels in an image that correspond to a particular color of the set of colors. For example, the pattern-detection application determines a color of the set of colors for each pixel. The pattern-detection application then identifies the set of pixels of the image layer having the particular color.

At step 704, the pattern-detection application selects a pixel of the set of pixels. In some instances, the pattern-detection application selects the pixel at a starting location within the transformed image. For example, the starting location can be a two-dimensional location coordinate of (0,0) which identifies a pixel at a bottom-left part of the duplicate image. In some instances, the pattern-detection application detects that the pixel has been already converted at the location, increments a dimension value (e.g., x-dimension, y-dimension) of the location, and determines whether a next pixel at the incremented location corresponds to the particular color. The pattern-detection application repeats the steps of incrementing and determining until the next pixel having the particular color has been identified (e.g., a pixel located at (1,0) location-coordinate value).

At step 706, the pattern-detection application identifies a pixel value of the pixel. If the pixel is defined in the three-channel color space (e.g., the RGB space, the HSL space), the pixel value may include three color-channel values that ranges between 0 and 255. Each of the color-channel values corresponds to a respective color channel (e.g., an R-color channel, a G-color channel). The pixel value defines a particular color of the set of colors.

At step 708, the pattern-detection application converts the pixel value of the pixel into another pixel value in another color space. In some instances, the other color space is an L*a*b* color space. As a result, the pixel is represented by the other pixel value that defines the particular color of the pixel in the other color space.

At step 710, the pattern-detection application repeats the steps 704 to 708 to process remaining pixels of the set of pixels. As a result, the other set of pixel values for the set of pixels are thereby generated. In some instances, the pattern-detection application repeats the steps 702-710 to convert pixels of all colors into the other color space. Process 700 terminates thereafter.

B. Modifying the Pixel Values to Depict the Simulated Color

After conversion, the pattern-detection application modifies one or more values of the other set of pixel values to generate a modified set of pixel values. In particular, the pattern-detection application modifies the a and b values of the L*a*b* color space to zero. The pattern-detection application determines a simulated color (e.g., a grayscale color) for the set of pixels, by adjusting another pixel value of the other set of pixel values (e.g., an L* value of the L*a*b* color space). The pattern-detection application thus outputs the set of pixels to depict the simulated color that is different from the particular color. The simulated color results in an increase of contrast ratio between the set of pixels depicting the simulated color and other pixels of the image. The increase of contrast between pixels of the image allows users with device limitations or color-vision deficiency to readily distinguish one or more patterns having the particular color from other patterns of the image that have different colors.

In some instances, the pattern-detection application determines the simulated color for each color of the set of colors. The pattern-detection application accesses a second set of pixels that identify a second color of the set of colors. The pattern-detection application converts a second initial set of pixel values of the second set of pixels to a third set of pixel values that define the second color in the other color space. The pattern-detection application modifies pixel values of the third set of pixel values to generate a second modified set of pixel values. The second modified set of pixel values cause the second set of pixels to visually indicate a second simulated color that is different from the second color and the simulated color. The above process can be repeated for other remaining colors of the set of colors of the image, thereby resulting in a simulated image (e.g., a grayscale image) that includes a set of simulated colors. In some instances, the simulated colors are generated, such that their respective color values are distributed across a contrast scale (e.g., a lightness axis) of the other color space. Such distribution allows the pixel patterns for each of the simulated colors to be readily distinguished from another.

Additionally or alternatively, the pattern-detection application determines an ordered sequence of the set of colors, at which the ordered sequence can be used determine a simulated color for each color of the set of colors. For each color of the set of colors, the pattern-detection application: (i) accesses a respective set of pixels; (ii) converts an initial set of pixel values of the respective set of pixels to another set of pixel values that define the color in the other color space; (iii) modifies a subset of pixel values of the other set of pixel values to determine an intermediate color. As a result, each color of the set of colors can be represented by a respective set of pixels that depict a corresponding intermediate color.

The pattern-detection application arranges the intermediate colors in an ordered sequence based on their pixel-intensity values (e.g., low-to-high L* values, high-to-low L* values). The pattern-detection application determines the simulated color for each intermediate color of the set of intermediate colors in accordance with the ordered sequence, such that the simulated colors are evenly distributed across a spectrum of a given color channel (e.g., L* channel). For example, the pattern-detection application determines a black simulated color with an L* value of 0 for another color that has the lowest lightness value in the ordered sequence and a light-gray color with an L* value of 75 for another intermediate color that has a higher lightness value in the ordered sequence. The pattern-detection application thus determines the simulated color for each color of the set of colors. To convert each color into the determined simulated color, the pattern-detection application further modifies at least one pixel value of the intermediate set of pixel values of the respective set of pixels to visually indicate the simulated color determined for the color.

Figure 8:
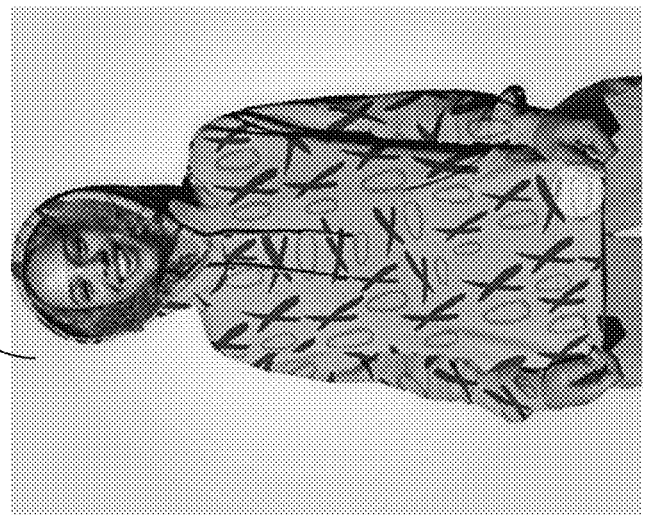
FIG. 8 shows an example set of images depicting an object with simulated colors, according to some embodiments.
Figure 8:
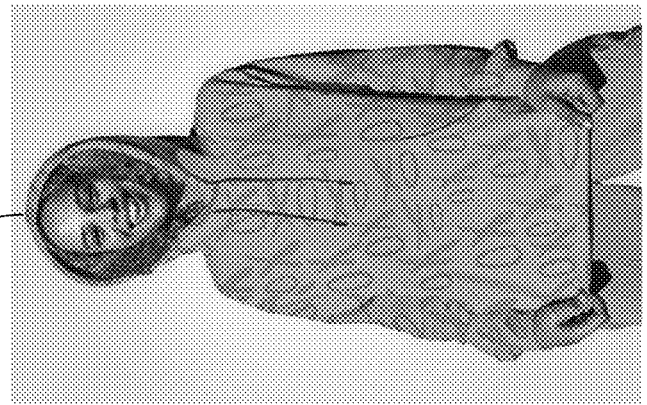

FIG. 8 shows an example set of images 800 depicting an object with simulated colors, according to some embodiments. In FIG. 8, the pattern-detection application modifies pixel values of an image 802 to cause the set of pixels to visually indicate a simulated color that is different from the particular color. For example, the teal color having an "X" pattern shown in the image 802 is processed by the pattern-detection application to generate a simulated image 804, which includes a black simulated color that represents the teal color. The black simulated color of the simulated image 804 results in a higher contrast between the colors, which allows a color-vision deficient user to recognize the patterns.

Example of a Computing Environment

Figure 9:
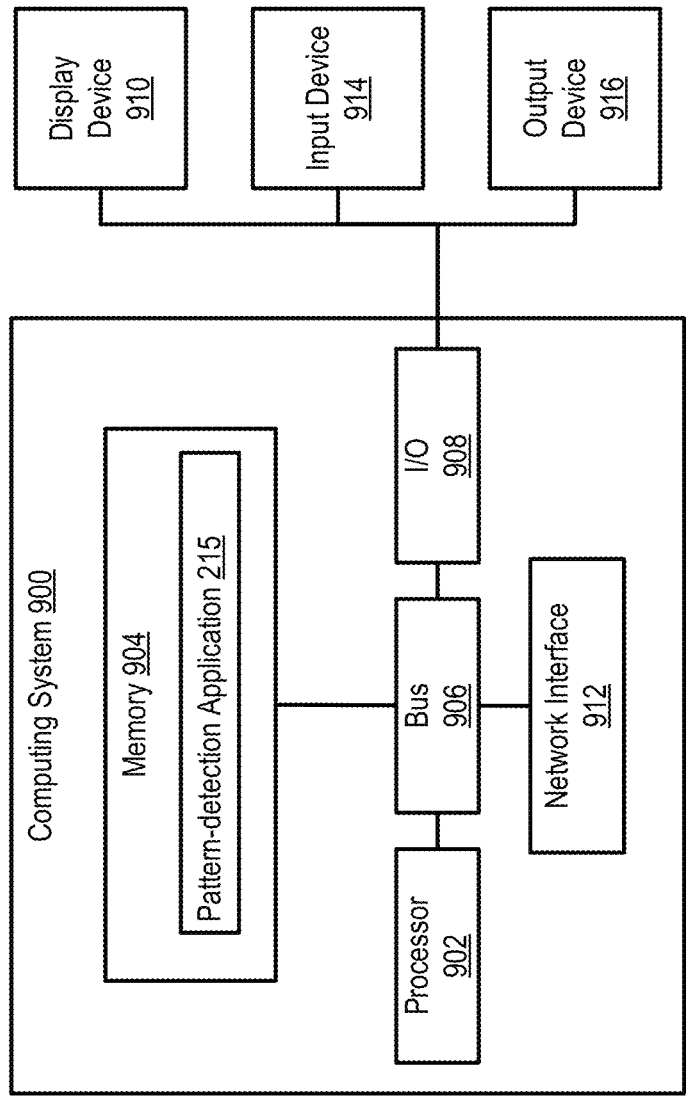
FIG. 9 depicts a computing system configured for increasing visibility of pixel patterns in images, in accordance with some embodiments.

Any suitable computing system or group of computing systems can be used for performing the operations described herein. For example, FIG. 9 depicts a computing system 900 that can implement any of the computing systems or environments discussed above. In some embodiments, the computing system 900 includes a processing device 902 that executes the pattern-detection application 102, a memory that stores various data computed or used by the pattern-detection application 102, an input device 914 (e.g., a mouse, a stylus, a touchpad, a touchscreen), and an output device 916 that presents output to a user (e.g., a display device that displays graphical content generated by the pattern-detection application 102). For illustrative purposes, FIG. 9 depicts a single computing system on which the pattern-detection application 102 is executed, and the input device 914 and output device 916 are present. But these applications, datasets, and devices can be stored or included across different computing systems having devices similar to the devices depicted in FIG. 9.

The example of FIG. 9 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 900 may also include a number of external or internal devices, such as a display device 910, or other input or output devices. For example, the computing system 900 is shown with one or more input/output ("I/O") interfaces 908. An I/O interface 908 can receive input from input devices or provide output to output devices. One or more buses 906 are also included in the computing system 900. Each bus 906 communicatively couples one or more components of the computing system 900 to each other or to an external component.

The computing system 900 executes program code that configures the processing device 902 to perform one or more of the operations described herein. The program code includes, for example, code implementing the pattern-detection application 102 or other suitable applications that perform one or more operations described herein. The program code may be resident in the memory device 904 or any suitable computer-readable medium and may be executed by the processing device 902 or any other suitable processor. In some embodiments, all modules in the pattern-detection application 102 are stored in the memory device 904, as depicted in FIG. 9. In additional or alternative embodiments, one or more of these modules from the pattern-detection application 102 are stored in different memory devices of different computing systems.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices (e.g., a computing device that receives inputs for pattern-detection application 102 or displays outputs of the pattern-detection application 102) via a data network using the network interface device 912.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. An output device 916 can include any device or group of devices suitable for providing visual, auditory, or other suitable sensory output. Non-limiting examples of the output device 916 include a touchscreen, a monitor, a separate mobile computing device, etc.

Although FIG. 9 depicts the input device 914 and the output device 916 as being local to the computing device that executes the pattern-detection application 102, other implementations are possible. For instance, in some embodiments, one or more of the input device 914 and the output device 916 include a remote client-computing device that communicates with the computing system 900 via the network interface device 912 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
    accessing, by a pattern-detection application, an image depicting an object;
    applying, by the pattern-detection application, a machine-learning model to the image to generate a transformed image, wherein generating the transformed image includes modifying one or more pixels of the image to reduce color distortions from the image;
    determining, by the pattern-detection application, a set of colors from the transformed image;
    identifying, by the pattern-detection application, a set of pixels depicting a particular color of the set of colors;
    converting, by the pattern-detection application, an initial set of pixel values of the set of pixels at an initial color space to another set of pixel values that define the particular color of the set of pixels in another color space;
    modifying, by the pattern-detection application, one or more values of the other set of pixel values to generate a modified set of pixel values, wherein the modifying includes causing the set of pixels visually indicate a simulated color that is different from the particular color; and
    outputting, by the pattern-detection application, the set of pixels depicting the simulated color to be displayed on a display device.

2. The computer-implemented method of claim 1, wherein determining the set of colors from the transformed image includes:
    applying, by the pattern-detection application, a clustering algorithm to the transformed image to assign each pixel of the transformed image to a respective cluster of a set of clusters; and
    for each cluster of the set of clusters:
        determining, based on the assigned pixels and by the pattern-detection application, a centroid for the cluster;
        determining, by the pattern-detection application, a color represented by the centroid of the cluster; and
        assigning, by the pattern-detection application, the color as being one of the set of colors.

3. The computer-implemented method of claim 2, wherein the clustering algorithm includes a k-medoids algorithm.

4. The computer-implemented method of claim 2, wherein the clustering algorithm includes a k-means algorithm.

5. The computer-implemented method of claim 1, wherein identifying the set of pixels depicting the particular color includes:
    for each color of the set of colors:
        determining, by the pattern-detection application, a color-difference metric between a pixel of the transformed image and a color value identifying the color; and
        associating, by the pattern-detection application, the color-difference metric for the color;
    determining, from the set of colors and by the pattern-detection application, that the particular color has the lowest color-difference metric relative to other colors of the set of colors; and
    assigning, by the pattern-detection application, the pixel as being one of the set of pixels for the particular color.

6. The computer-implemented method of claim 1, further comprising:
generating, by the pattern-detection application, an image layer;
assigning, by the pattern-detection application, pixel values of the set of pixels to the image layer; and
applying, by the pattern-detection application, the image layer to the image to generate a segmented image, wherein the segmented image identifies the set of pixels while masking other pixels of the set of pixels.

7. The computer-implemented method of claim 6, further comprising outputting, by the pattern-detection application, the image layer for displaying the image layer on a user interface.

8. The computer-implemented method of claim 6, wherein assigning the pixel values of the set of pixels to the image layer includes receiving a user input that identifies one or more regions in the image, wherein the one or more regions include the set of pixels.

9. The computer-implemented method of claim 1, wherein:
the initial color space is a Red, Green, Blue (RGB) color space or a Hue, Saturation, Brightness (HSB) color space; and
the other color space is an L*a*b* color space.

10. The computer-implemented method of claim 1, wherein modifying the one or more values of the other set of pixel values includes modifying a pixel value associated with an L* channel of the L*a*b* color space.

11. The computer-implemented method of claim 1, wherein a first contrast ratio between the simulated color and another color of the set of colors is greater than a second contrast ratio between the particular color and the other color.

12. A system comprising:
a color-identification module configured to:
access an image depicting an object;
apply a machine-learning model to the image to generate a transformed image, wherein generating the transformed image includes modifying one or more pixels of the image to reduce color distortions from the image; and
determine a set of colors from the transformed image;
a segmentation module configured to:
access the image and the determined set of colors; and
identify a set of pixels depicting a particular color of the set of colors; and a color-conversion module configured to:
access the set of pixels;
convert an initial set of pixel values of the set of pixels at an initial color space to another set of pixel values that define the particular color of the set of pixels in another color space; and
modify one or more values of the other set of pixel values to generate a modified set of pixel values, wherein the modifying includes causing the set of pixels visually indicate a simulated color that is different from the particular color.

13. The system of claim 12, wherein determining the set of colors from the transformed image includes:
applying a clustering algorithm to the transformed image to assign each pixel of the transformed image to a respective cluster of a set of clusters;
for each cluster of the set of clusters:
determining, based on the assigned pixels, a centroid for the cluster;
determining a color represented by the centroid of the cluster; and
assigning the color as being one of the set of colors.

14. The system of claim 12, wherein identifying the set of pixels depicting the particular color includes:
for each color of the set of colors:
determine a color-difference metric between a pixel value of a pixel of the transformed image and a color value identifying the color; and
associate the color-difference metric for the color;
determine, from the set of colors, that the particular color has the lowest color-difference metric relative to other colors of the set of colors; and
assign the pixel as being one of the set of pixels for the particular color.

15. The system of claim 12, wherein the segmentation module is further configured to:
generate an image layer;
assign pixel values of the set of pixels to the image layer; and
apply the image layer to the image to generate a segmented image, wherein the segmented image identifies the set of pixels while masking other pixels of the set of pixels.

16. The system of claim 12, wherein:
the initial color space is a Red, Green, Blue (RGB) color space or a Hue, Saturation, Brightness (HSB) color space; and
the other color space is an L*a*b* color space.

17. The system of claim 12, wherein modifying the one or more values of the other set of pixel values includes modifying a pixel value associated with an L* channel of the L*a*b* color space.

18. The system of claim 12, wherein a first contrast ratio between the simulated color and another color of the set of colors is greater than a second contrast ratio between the particular color and the other color.

19. A non-transitory computer-readable medium storing processor-executable instructions configured to cause one or more processors to perform actions including:
receiving an image depicting an object;
a step of generating a simulated color for a set of pixels of the image, wherein the simulated color is generated by: (i) processing the image using a machine-learning model to reduce color distortions from the image; (ii) identifying a particular color from the processed image; (iii) identifying the set of pixels depicting the particular color; and (iv) modifying pixel values of the set of pixels to depict the simulated color that is different from the particular color; and
outputting the set of pixels depicting the simulated color to be displayed on a display device.

20. The non-transitory computer-readable medium of claim 19, wherein a first contrast ratio between the simulated color and another color of the image is greater than a second contrast ratio between the particular color and the other color.

* * * * *